US010012316B2

(12) United States Patent
Taguchi et al.

(10) Patent No.: US 10,012,316 B2
(45) Date of Patent: Jul. 3, 2018

(54) SLIDE VALVE

(71) Applicant: Shimadzu Corporation, Kyoto (JP)

(72) Inventors: Tatsuhiro Taguchi, Kyoto (JP); Masahito Kogame, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 234 days.

(21) Appl. No.: 14/740,408

(22) Filed: Jun. 16, 2015

(65) Prior Publication Data

US 2016/0040788 A1  Feb. 11, 2016

(30) Foreign Application Priority Data

Aug. 6, 2014 (JP) .................................. 2014-160173

(51) Int. Cl.
| | | |
|---|---|---|
| *F16K 3/04* | (2006.01) | |
| *F16K 3/02* | (2006.01) | |
| *F16K 3/20* | (2006.01) | |
| *F16K 1/18* | (2006.01) | |
| *F16K 1/20* | (2006.01) | |

(52) U.S. Cl.
CPC .......... *F16K 3/0227* (2013.01); *F16K 3/0218* (2013.01); *F16K 3/04* (2013.01); *F16K 3/207* (2013.01); *F16K 1/18* (2013.01); *F16K 1/20* (2013.01)

(58) Field of Classification Search
CPC ............ F16K 3/04; F16K 3/0207; F16K 1/18; F16K 1/20
USPC ........................................................ 251/301
See application file for complete search history.

(56) References Cited

U.S. PATENT DOCUMENTS 3,343,562 A * 9/1967 Combes .................... F16K 3/10
                                                                137/315.16
3,512,751 A * 5/1970 Fitzgerald ................. F16K 3/04
                                                                137/246.22

(Continued)

FOREIGN PATENT DOCUMENTS

| DE | 2746609 A | 4/1979 |
|---|---|---|
| JP | U11988132175 A | 8/1988 |
| WO | WO 2013/073039 | 5/2013 |

OTHER PUBLICATIONS

Office Action for corresponding Chinese Application No. 201510321315.0, dated May 22, 2017 (English Translation).

(Continued)

*Primary Examiner* — Matthew W Jellett
*Assistant Examiner* — Christopher Ballman
(74) *Attorney, Agent, or Firm* — Renner, Otto, Boisselle & Sklar, LLP

(57) ABSTRACT

A slide valve comprises: a casing having a pair of facing flow channels; a slide plate inserted into and removed from a space between the flow channels; and an annular sealing body slidingly moving in a facing direction of the flow channels inside the casing and coming into contact with the slide plate inserted between the flow channels to bring the slide valve into a closed state. A first sealing member sealing a gap between the sealing body and the inner peripheral wall surface is disposed on an inner peripheral surface of the annular sealing body and a second sealing member sealing a gap between the sealing body and the outer peripheral wall surface is formed on an outer peripheral surface of the annular sealing body.

4 Claims, 9 Drawing Sheets

(56) References Cited

U.S. PATENT DOCUMENTS

| | | | | |
|---|---|---|---|---|
| 4,333,631 A | * | 6/1982 | Bosch | F16K 3/10 251/159 |
| 4,373,546 A | * | 2/1983 | Krakovsky | F16K 3/06 137/330 |
| 4,381,100 A | * | 4/1983 | Schoenberg | F16K 3/188 137/554 |
| 4,546,954 A | * | 10/1985 | Bodnar | F02D 9/14 251/113 |
| 5,577,707 A | | 11/1996 | Brida | |
| 5,927,684 A | * | 7/1999 | Marx | F16K 3/20 251/195 |
| 6,089,537 A | * | 7/2000 | Olmsted | F16K 3/10 251/129.11 |
| 6,328,051 B1 | * | 12/2001 | Maher | F16K 3/06 137/1 |
| 6,409,149 B1 | * | 6/2002 | Maher, Jr. | F16K 3/06 251/187 |
| 6,494,434 B1 | * | 12/2002 | Geiser | F16K 1/24 251/229 |
| 6,776,394 B2 | * | 8/2004 | Lucas | F16K 3/10 251/203 |
| 6,902,145 B2 | * | 6/2005 | Latzer | F16K 3/10 251/170 |
| 6,994,317 B2 | * | 2/2006 | Fischer | F16K 3/029 251/193 |
| 7,004,453 B1 | * | 2/2006 | Cheng | F16K 3/06 251/167 |
| 7,032,882 B2 | * | 4/2006 | Lucas | F16K 3/06 251/302 |
| 7,090,192 B2 | * | 8/2006 | Weiss | F16K 3/06 137/613 |
| 7,278,444 B2 | * | 10/2007 | Lucas | F16K 3/06 137/599.18 |
| 7,396,001 B2 | * | 7/2008 | Geiser | F16K 51/02 251/193 |
| 7,413,162 B2 | * | 8/2008 | Geiser | F16K 3/10 251/175 |
| 7,654,505 B2 | * | 2/2010 | Schoen | F16K 3/10 251/175 |
| 7,802,772 B2 | * | 9/2010 | Geiser | F16K 3/10 251/175 |
| 8,424,843 B2 | * | 4/2013 | Ehrne | F16K 51/02 251/187 |
| 8,550,430 B2 | * | 10/2013 | Lamprecht | F16K 51/02 251/158 |
| 8,733,734 B2 | * | 5/2014 | Nakamura | F16K 1/2085 251/174 |
| 8,763,985 B2 | * | 7/2014 | Miki | F16K 3/06 250/492.2 |
| 8,833,388 B2 | * | 9/2014 | Eto | H01L 21/67253 137/487.5 |

OTHER PUBLICATIONS

Notification of Reasons for Refusal regarding patent application No. 2014-160173, dated Mar. 13, 2018 (English Translation).

\* cited by examiner

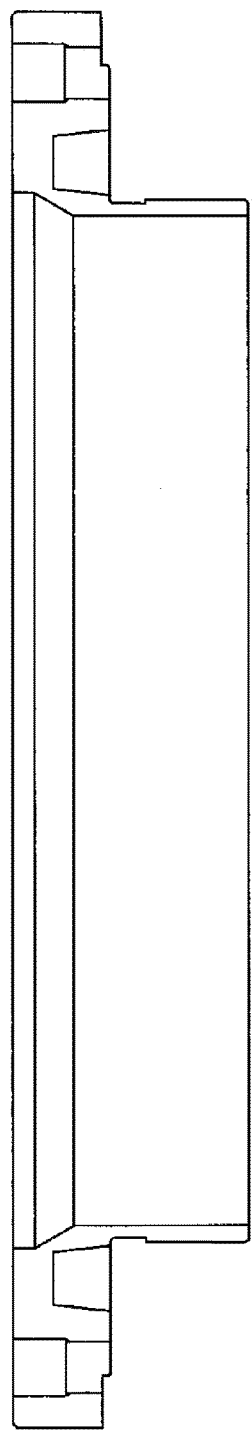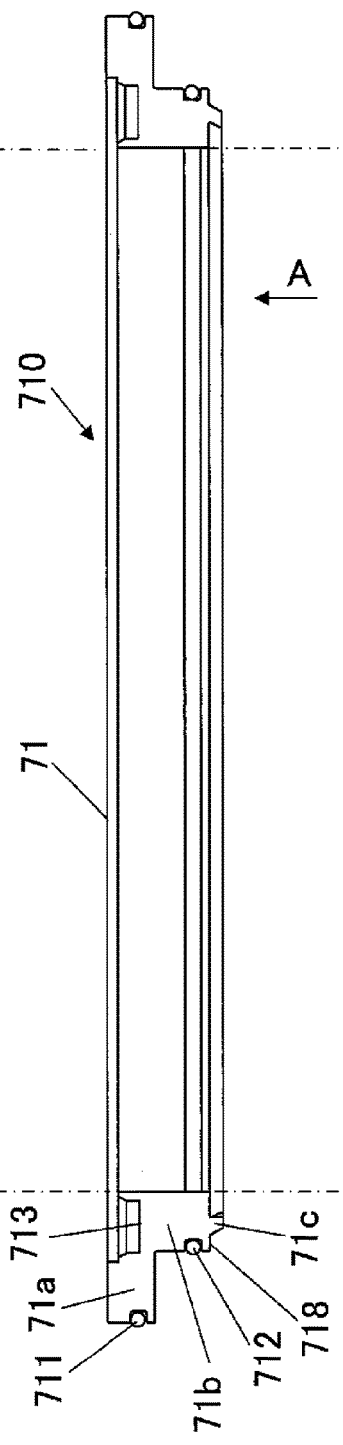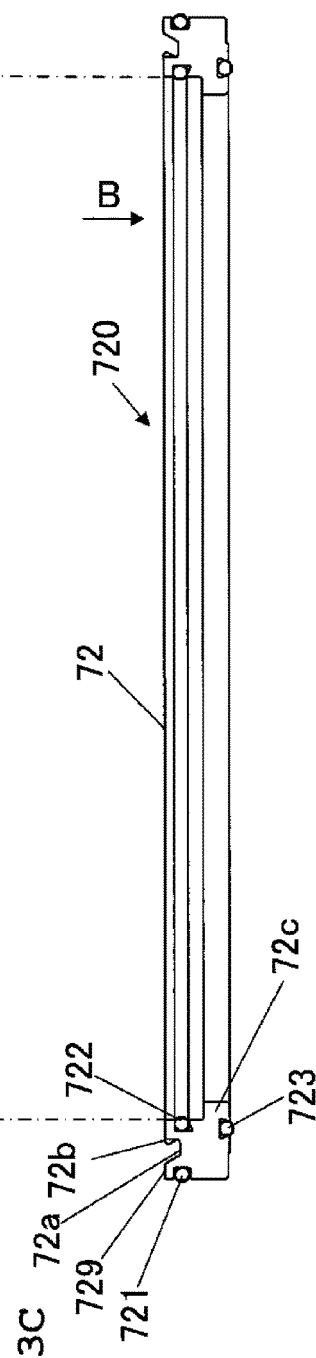

X1-X1
cross-sectional
view

X2-X2
cross-sectional
view

X3-X3
cross-sectional
view

X4-X4
cross-sectional
view

X1-X1 cross-sectional part

X2-X2 cross-sectional part

X1-X1 cross-sectional part

X2-X2 cross-sectional part

SLIDE VALVE

BACKGROUND OF THE INVENTION

1. Field of the Invention

The present invention relates to a slide valve.

2. Description of the Related Art

When a vacuum pump, for example, a turbo-molecular pump is attached to a vacuum chamber of a vacuum processing apparatus, a slide valve is generally interposed therebetween.

A slide valve described in Patent Literature 1 (U.S. Pat. No. 5,577,707) adjusts the flow rate by allowing a slide plate to slide so as to be inserted into and removed from a flow channel. In order to bring the valve into a fully closed state, an annular sealing body provided with a seal ring is allowed to come into contact with the edge of the slide plate inserted into the flow channel to thereby block the flow channel.

The sealing body described in Patent Literature 1 includes the seal ring, an annular piston, and a plurality of bolts which connect the seal ring and the piston to each other, the bolts being arranged in the circumferential direction. The piston is driven by using a spring and compressed air to thereby allow the sealing body to come into contact with and separate from the slide plate.

Along with the operation of the valve, a shift in the positional relationship in the circumferential direction between a fixation part of the seal ring and a fixation part of the piston may occur. In the invention described in Patent Literature 1, a line connecting a fixation position on the seal ring to a fixation position on the piston of each of the bolts may not be parallel to a movement direction of the sealing body due to the above position shift. In this case, of course, the bolt is also not parallel to the movement direction of the sealing body.

An O-ring is disposed between the peripheral surface of each of the bolts and a wall surface of a space in which the bolt is housed. When the bolt is not parallel to the movement direction of the sealing body as described above, the O-ring have uneven contact, thereby deteriorating the sealability of the O-ring. As a result, compressed air or atmospheric air may leak toward a vacuum system or an operational failure caused by contact between the bolt and the wall surface around the bolt may occur. Thus, the performance as a slide valve cannot be ensured.

SUMMARY OF THE INVENTION

A slide valve comprises: a casing having a pair of facing flow channels; a slide plate inserted into and removed from a space between the flow channels; and an annular sealing body slidingly moving in a facing direction of the flow channels inside the casing and coming into contact with the slide plate inserted between the flow channels to bring the slide valve into a closed state. An annular housing section having an inner peripheral wall surface and an outer peripheral wall surface and housing the slidingly moving sealing body is formed on the casing, and a first sealing member sealing a gap between the sealing body and the inner peripheral wall surface is disposed on an inner peripheral surface of the annular sealing body and a second sealing member sealing a gap between the sealing body and the outer peripheral wall surface is formed on an outer peripheral surface of the annular sealing body.

The sealing body includes an annular seal ring on which the first sealing member and the second sealing member are disposed. An annular piston member which is connected to the seal ring in a slide direction in a stacked state and driven to slide.

A projecting engagement portion is formed on one connection surface of the seal ring and the piston member, and a recessed engagement portion which is detachably engaged with the projecting engagement portion is formed on the other connection surface of the seal ring and the piston member.

The seal ling is detachably connected to the piston member, and all of the sealing member, including the first sealing member and the second sealing member, making contact with gas flowing through the flow channels is disposed on the seal ling.

A slide valve comprises: a casing having a pair of facing flow channels; a slide plate inserted into and removed from a space between the flow channels; and an annular sealing body slidingly moving in a facing direction of the flow channels inside the casing and coming into contact with the slide plate inserted between the flow channels to bring the slide valve into a closed state. An annular housing section having an inner peripheral wall surface and an outer peripheral wall surface and housing the slidingly moving sealing body is formed on the casing. The sealing body includes an annular seal ring, and an annular piston member which is connected to the seal ring in a slide direction in a stacked state and driven to slide.

BRIEF DESCRIPTION OF THE DRAWINGS

FIGS. 3A to 3C are cross-sectional views showing a flange, a piston member, and a seal ring of the slide valve according to the embodiment of the present invention;

DETAILED DESCRIPTION OF PREFERRED EMBODIMENT

Embodiment

Figure 1:
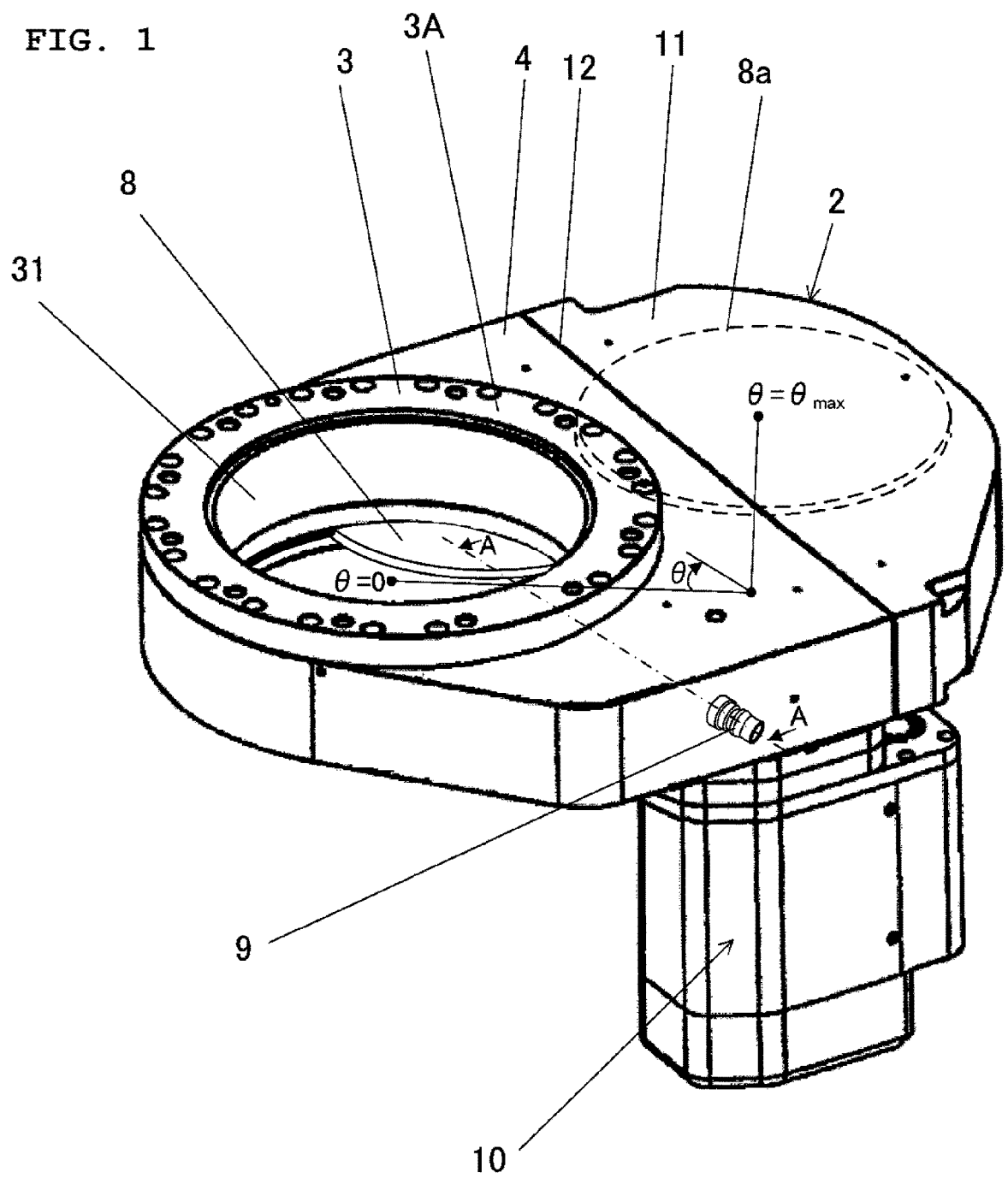
FIG. 1 is a perspective view showing a slide valve according to an embodiment of the present invention.
Figure 2:
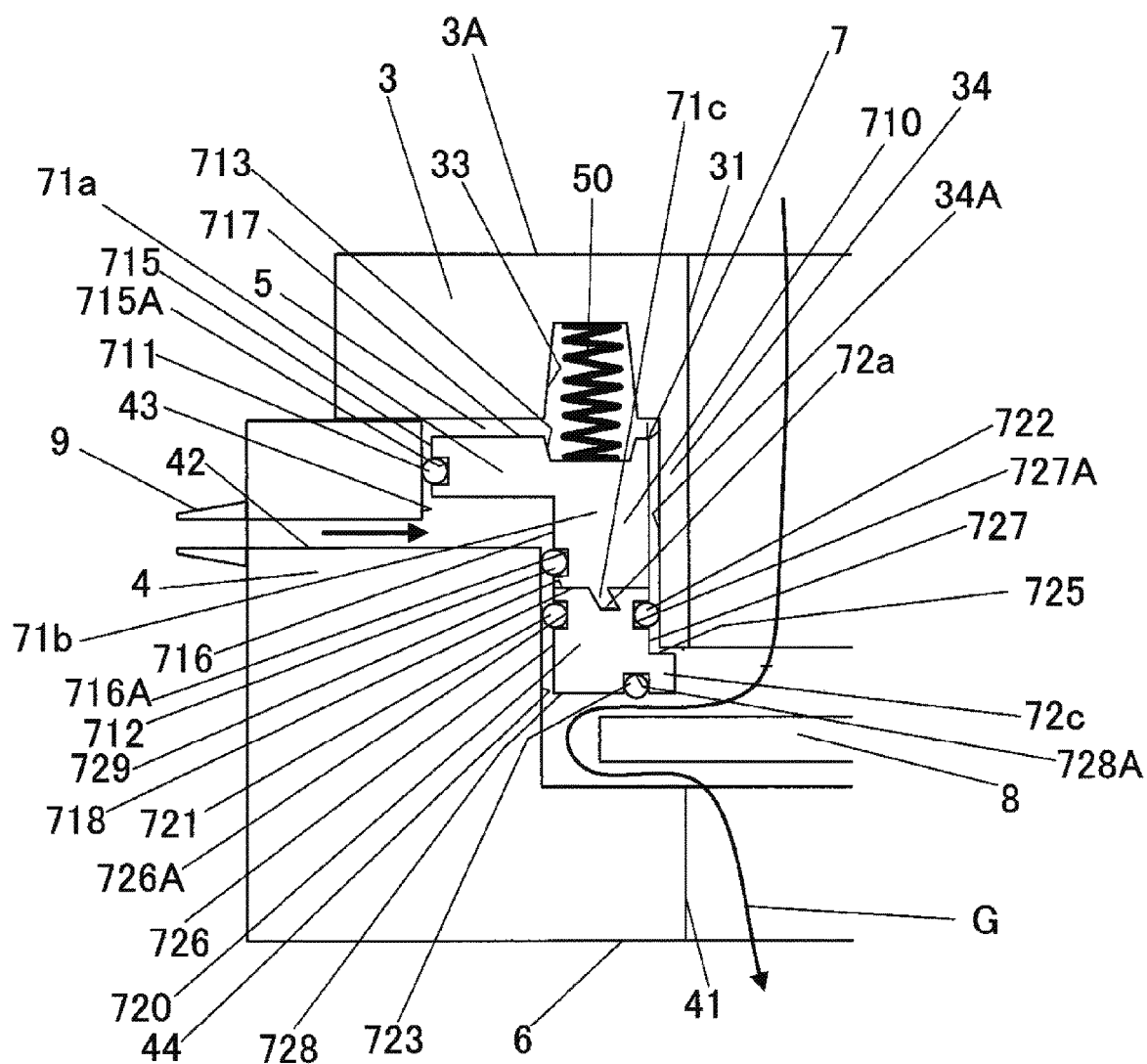
FIG. 2 is a partial cross-sectional view of the slide valve according to the embodiment of the present invention.

FIGS. 1 and 2 are diagrams showing a slide valve 1 according to an embodiment of the present invention. FIG. 1 is a perspective view showing the appearance of the slide valve 1. FIG. 2 is a cross-sectional view taken along line A-A of FIG. 1.

The slide valve (vacuum valve) 1 is provided with a casing 2 and a driving unit 10. The casing 2 is provided with a flange 3, a casing base 4 on which a fastening surface 6

(refer to FIG. 2) and a coupler 9 are formed, and a slide plate (valve body) 8 which is driven to slide inside the casing base 4. A fastening surface 3A of the flange 3 is fixed to a vacuum chamber of a vacuum processing apparatus, and a vacuum pump is fixed to the fastening surface 6. Although not illustrated, the driving unit 10 is provided with a motor which drives the slide plate 8 to swing and a controller which controls driving of the motor.

In FIG. 1, θ represents a θ opening degree of the slide plate 8. In FIG. 1, "θ=0" represents a θ opening degree at which an flow channel (opening) 31 of the flange 3 is fully closed, and "θ=θ$_{max}$" represents a θ opening degree at which the flow channel 31 of the flange 3 is fully opened. A slide plate 8a indicated by a broken line is the valve 8 in a fully open state (θ=θ$_{max}$). The slide plate 8 is driven to swing by the motor of the driving unit 10 so as to adjust the θ opening degree to thereby adjust the flow rate of gas flowing to the vacuum pump from the vacuum processing apparatus.

The casing 2 has an extraction port 12 to which an openable cover 11 is attached. The extraction port 12 is provided for replacing a component disposed inside the casing 2 without removing the slide valve 1 from the vacuum processing apparatus or the vacuum pump.

FIG. 2 is a cross-sectional view taken along line A-A of FIG. 1. However, differing from FIG. 1, FIG. 2 shows the valve 8 only in a fully closed state (θ=0).

The flange 3 has the fastening surface 3A, the flow channel (opening) 31, a recess 33, and a tubular section 34. The casing base 4 has the coupler 9, a vent hole 42, an flow channel (opening) 41, and the fastening surface 6. Although not illustrated, the flange 3 and the casing base 4 are fastened with each other using bolts.

The flow channel 31 and the flow channel 41 face each other. The slide plate 8 is inserted into and removed from a space between the flow channel 31 and the flow channel 41. In the following description, in a facing direction of the flow channel 31 and the flow channel 41 (in the up-down direction in FIG. 2), a side corresponding to the fastening surface 3A (the upper side in FIG. 2) is merely referred to as "fastening surface 3A side", and in a facing direction of the flow channel 31 and the flow channel 41, a side corresponding to the fastening surface 6 (the lower side in FIG. 2) is merely referred to as "fastening surface 6 side".

The casing 2 has a tubular housing section 5 located between the flange 3 and the casing base 4. The housing section 5 has a tubular inner peripheral wall surface having an outer peripheral surface 34A of the tubular section 34 (described below) and a tubular outer peripheral wall surface having an inner peripheral surface 43 (described below). A sealing body 7 is housed in the housing section 5.

The sealing body 7 includes a piston member 710 and a seal ring 720. Hereinbelow, the structure of the piston member 710 and the seal ring 720 will be further described with reference to FIGS. 3A to 3C. FIG. 3A is a cross-sectional view in the axial direction of the flange 3. FIG. 3B is a cross-sectional view in the axial direction of the piston member 710. FIG. 3C is a cross-sectional view in the axial direction of the seal ring 720. As shown in FIGS. 3A to 3C, the flange 3, the piston member 710, and the seal ring 720 are manufactured as separate bodies.

As shown in FIG. 3B, the piston member 710 has a base 71, a sealing member 711, and a sealing member 712. The base 71 has a pressure receiving section 71a, a tubular section 71b, a projection 71c, and a recess 713. As shown in FIG. 3C, the seal ring 720 has a base 72, a sealing member 721, a sealing member 722, and a sealing member 723. The base 72 has a groove 72a, a plurality of engagement portions 72b, and an annular section 72c.

Referring back to FIG. 2, the outer peripheral surface of the piston member 710 includes a large diameter section 715 (the outer peripheral surface of the pressure receiving section 71a) and a small diameter section 716 (the outer peripheral surface of the tubular section 71b). In the piston member 710, the sealing member 711 is disposed in a recess 715A which is formed on the large diameter section 715, and the sealing member 712 is disposed in a recess 716A which is formed on the small diameter section 716. Further, in the piston member 710, the recess 713 is formed on an end surface 717 which faces the recess 33 of the flange 3, and the projection 71c is formed on a connection surface 718 which is connected to the seal ring 720.

In the seal ring 720, the sealing member 721 is disposed in a recess 726A which is formed on an outer peripheral surface 726, the sealing member 722 is disposed in a recess 727A which is formed on an inner peripheral surface 727, the sealing member 723 is disposed in a recess 728A which is formed on an end surface 728 on the fastening surface 6 side, and the groove 72a is formed on a connection surface 729 which is an end surface on the fastening surface 3A side.

A compression spring 50 is disposed between the recess 33 and the recess 713.

The piston member 710 and the seal ring 720 are connected to each other by engagement between the projection 71c and the groove 72a. Thus, the piston 710 and the seal ring 720 are integrally movable as the sealing body 7. Details of the engagement between the projection 71c and the groove 72a will be described below.

Compressed air introduced through the coupler 9 passes through the vent hole 42 and acts on the pressure receiving section 71a of the piston member 710. The sealing member 711 seals a gap between the piston member 710 and the inner peripheral surface 43 of the casing base 4. The sealing member 712 seals a gap between the piston member 710 and an inner peripheral surface 44 of the casing base 4. The sealing performed by each of the sealing members 711 and 712 prevents leakage of the compressed air. The piston member 710 receives a force on the fastening surface 3A side from the compressed air through the pressure receiving section 71a. The piston member 710 receives a force on the fastening surface 6 side from the compression spring 50 through the recess 713. When the force received from the compressed air is larger than the force received from the compression spring 50, the sealing body 7 slidingly moves toward the fastening surface 3A side. On the other hand, when the force received from the compression spring 50 is larger than the force received from the compressed air, the sealing body 7 slidingly moves toward the fastening surface 6 side. That is, the sealing body 7 slidingly moves in the facing direction of the flow channel 31 and the flow channel 41 by the compression spring 50 and the compressed air.

When the slide plate 8 is fully closed (θ=0), the sealing body 7 slidingly moves toward the fastening surface 6 side by receiving the force of the compression spring 50. This slide movement enables the sealing body 7 to come into contact with the slide plate 8 with the sealing member 723 of the seal ring 720 interposed therebetween. Accordingly, it is possible to block gas (gas G illustrated in FIG. 2) which flows out of the vacuum processing apparatus, then flows through the inner peripheral side of the flow channel 31 and the flow channel 41, and then flows out to the vacuum pump, that is, to bring the slide valve 1 into a closed state.

The sealing member 721 seals a gap between the seal ring 720 and the inner peripheral surface 44 of the casing base 4, that is, a gap between the seal ring 720 and the outer peripheral wall surface of the housing section 5. The sealing member 722 seals a gap between the seal ring 720 and the outer peripheral surface 34A of the tubular section 34, that is, a gap between the seal ring 720 and the inner peripheral wall surface of the housing section 5.

Since the slide valve 1 is provided with the annular housing section 5, the annular sealing body 7 which is housed in the housing section 5, and the sealing members 721 and 722 which are disposed between the housing section 5 and the sealing body 7 as described above, it is possible to ensure the sealability of the sealing members 721 and 722 and thereby prevent the gas G from leaking toward the piston member 710. As a result, the reliability of the slide valve 1 is enhanced.

Further, since the sealing members 721 and 722 are disposed on the seal ring 720, it is possible to prevent a connection region between the seal ring 720 and the piston member 710 and the gas G from making contact with each other. The connection region between the seal ring 720 and the piston member 710 is a worn part. Thus, even if wear dust is generated, it is possible to prevent the wear dust from flowing out into the gas G.

When the end surface 717 formed on the sealing body 7 comes into contact with the flange 3, the movement of the sealing body 7 toward the fastening surface 3A side is stopped.

Figure 4A:
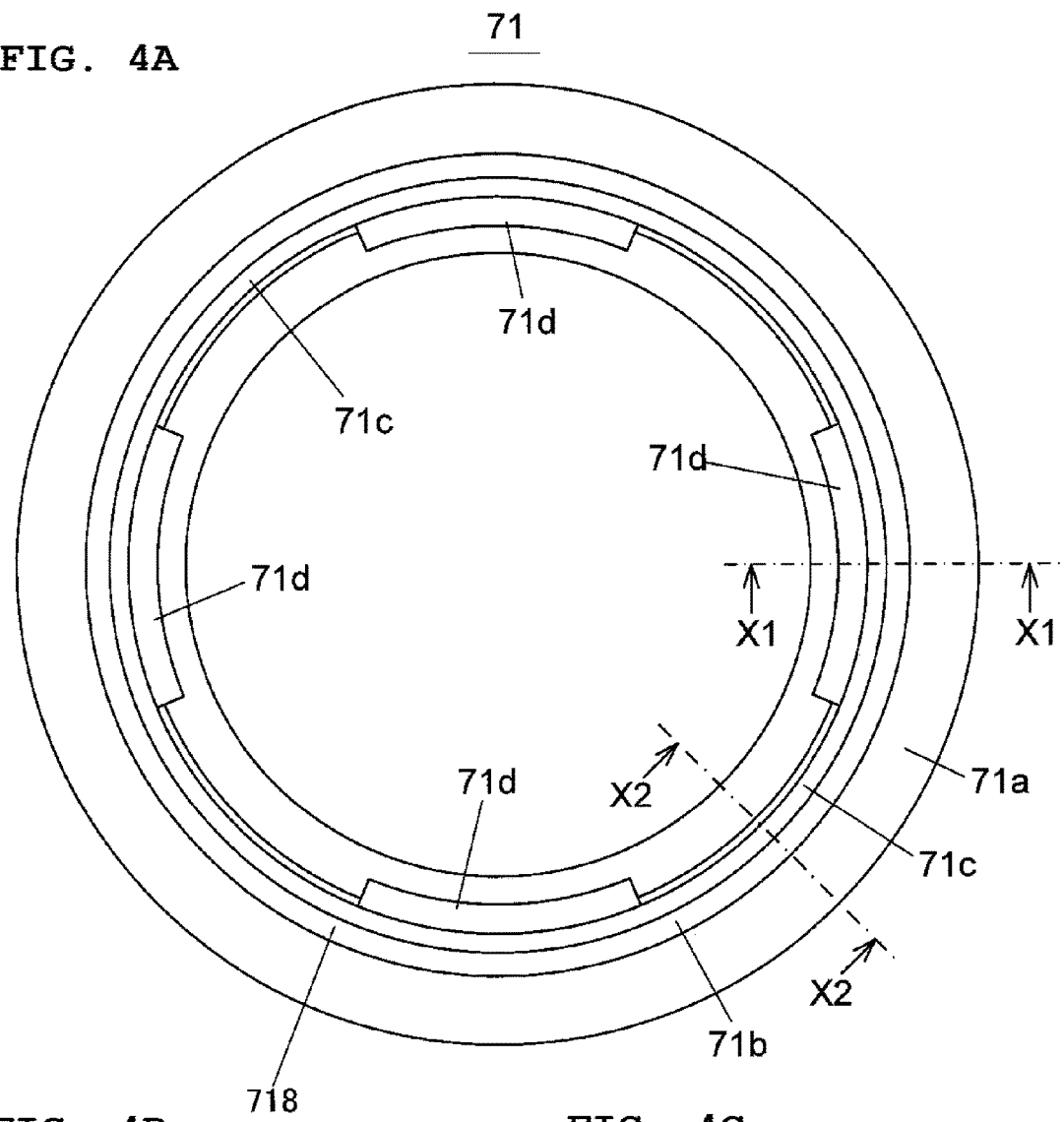
FIGS. 4A to 4C are diagrams showing the piston member of the slide valve according to the embodiment of the present invention.
Figure 4B:
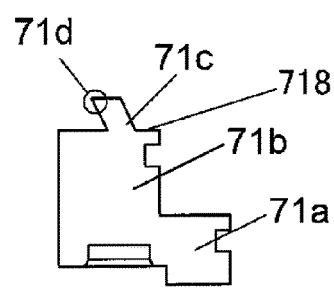
Figure 4C:
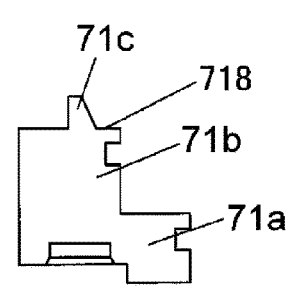

FIGS. 4A to 6B are diagrams describing a connection structure between the base 71 of the piston member 710 and the base 72 of the seal ring 720. FIGS. 4A to 4C are diagrams describing the structure of the base 71. FIG. 4A shows the base 71 viewed from arrow A (refer to FIG. 3). FIG. 4B is a cross-sectional view taken along line X1-X1. FIG. 4C is a cross-sectional view taken along line X2-X2. The ring-like projection 71c is formed on the connection surface 718 of the base 71, the connection surface being connected to the seal ring 720, that is, the end surface 718 of the tubular section 71b. A plurality of engagement portions 71d are formed on the projection 71c along the circumferential direction. In the example shown in FIGS. 4A to 4C, four engagement portions 71d are formed at a pitch of 90°. Each of the engagement portions 71d has a triangular cross-sectional shape and projects toward the inner peripheral side of the projection 71c.

Figure 5A:
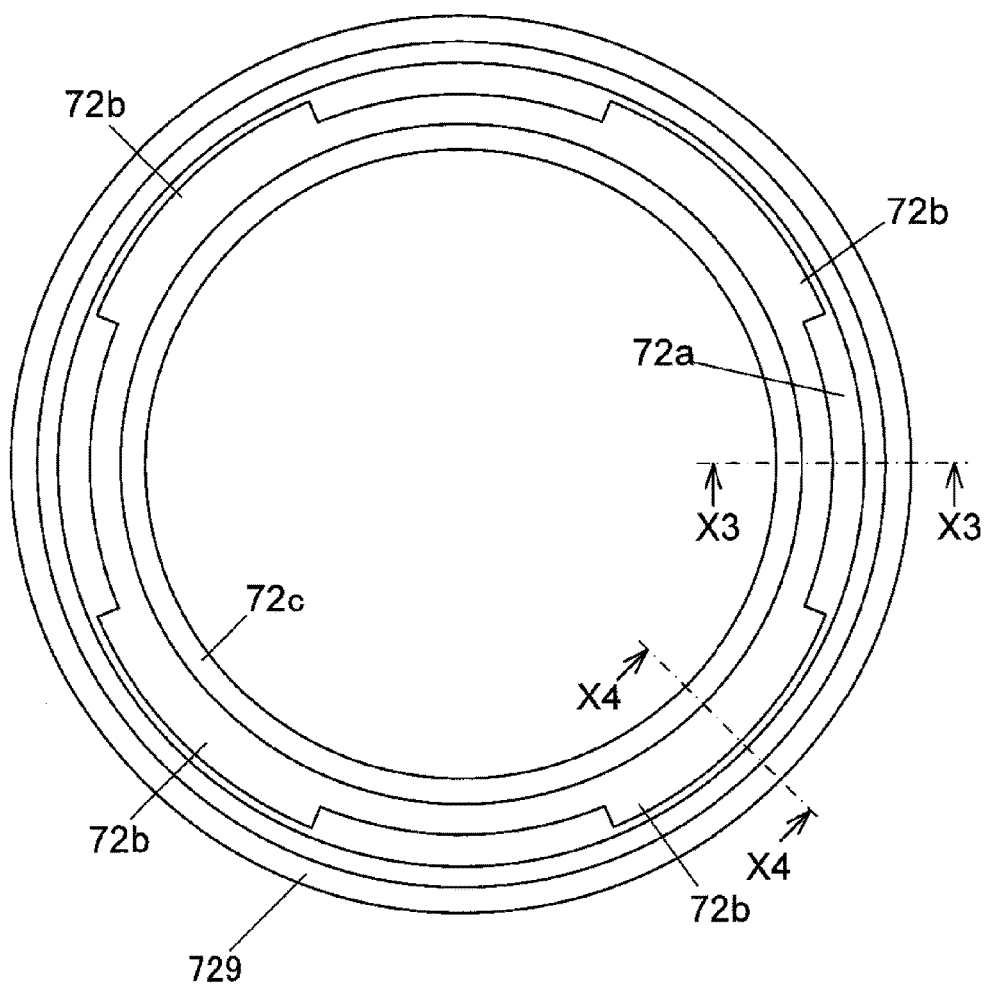
FIGS. 5A to 5C are diagrams showing the seal ring of the slide valve according to the embodiment of the present invention.
Figure 5B:
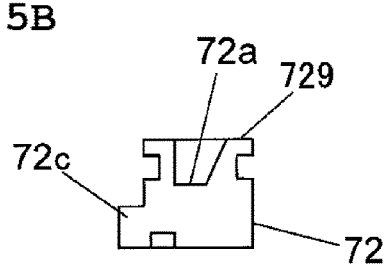
Figure 5C:
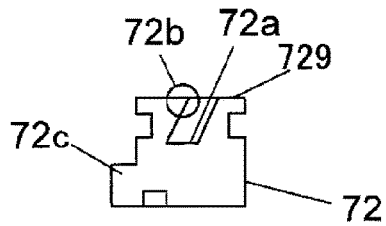

FIGS. 5A to 5C are diagrams describing the structure of the base 72 of the seal ring 720. FIG. 5A shows the base 72 viewed from arrow B (refer to FIG. 3). FIG. 5B is a cross-sectional view taken along line X3-X3. FIG. 5C is a cross-sectional view taken along line X4-X4. The ring-like groove 72a is formed on the connection surface 729 of the base 72, the connection surface 729 being connected to the piston member 710. The engagement portions 72b are formed on the groove 72a along the circumferential direction. In the example shown in FIGS. 5A to 5C, four engagement portions 72b are formed at a pitch of 90°. In the cross-sectional shape of the groove 72a in a region in which the engagement portions 72b are not formed, the inner side surface is formed in a vertical surface as shown in FIG. 5B. On the other hand, the outer side surface of the groove 72a is formed in an oblique surface which is inclined in such a manner that the groove width is reduced toward the bottom surface.

Figure 6A:
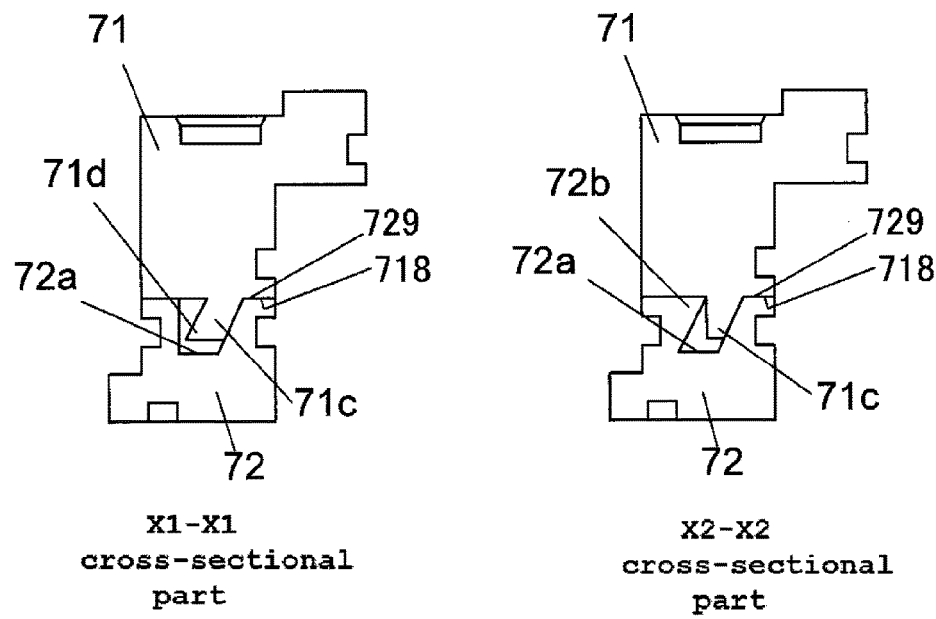
FIGS. 6A and 6B are diagrams for describing engagement between the piston member and the seal ring of the slide valve according to the embodiment of the present invention.
Figure 6B:
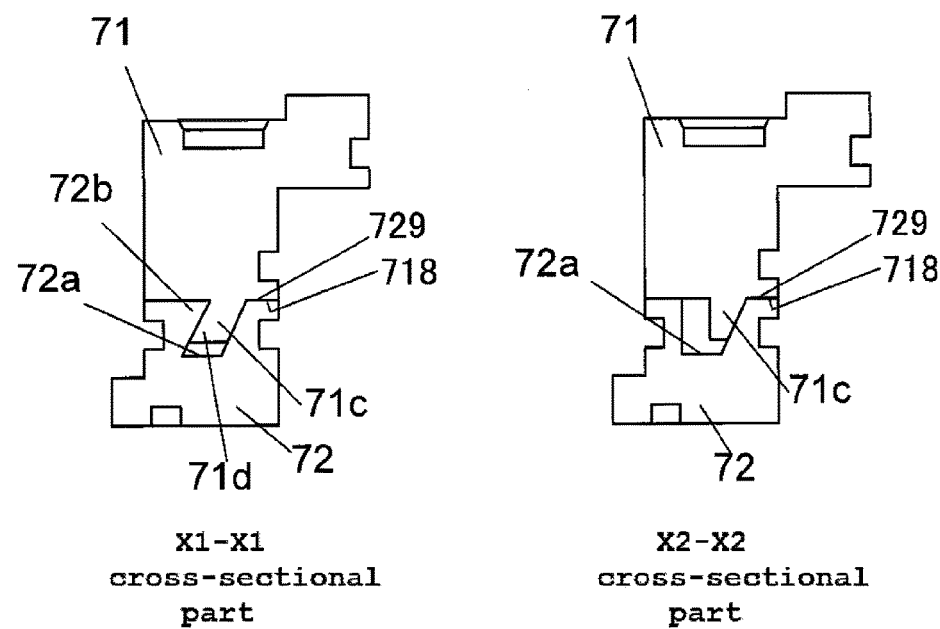

FIGS. 6A and 6B are diagrams describing connection of the base 72 of the seal ring 720 to the base 71 of the piston member 710. In a step shown in FIG. 6A, the connection surface of the base 71 of the piston member 710 and the connection surface of the base 72 of the seal ring 720 are brought to face each other in the arrangement shown in FIGS. 4A to 5C. At this point, as shown in the left figure (X1-X1 cross-sectional part) of FIG. 6A, a part of the projection 71c in which the engagement portions 71d are formed is inserted into a part of the groove 72a of the base 72 of the seal ring 720 in which the engagement portions 72b are not formed. On the other hand, as shown in the right figure (X2-X2 cross-sectional part), a part of the projection 71c in which the engagement portions 71d are not formed is inserted into a part of the groove 72a of the base 72 in which the engagement portions 72b are formed.

Then, a state shown in FIG. 6A is brought into a state shown in FIG. 6B by rotating the base 72 of the seal ring 720 by 45° with respect to the base 71 of the piston member 710. The part of the projection 71c in which the engagement portions 71d are formed moves into the part of the groove 72a in which the engagement portions 72b are formed as shown in the left figure (X1-X1 cross-sectional part) of FIG. 6B. As a result, the engagement portions 71d of the projection 71c of the base 71 of the piston member 710 are engaged with the respective engagement portions 72b of the groove 72a of the base 72 of the seal ring 720, so that the base 72 of the seal ring 720 is fixed to the base 71 of the piston member 710. On the other hand, when the base 72 of the seal ring 720 is rotated by 45°, the part of the projection 71c in which the engagement portions 71d are not formed moves into the part of the groove 72a in which the engagement portions 72b are not formed as shown in the right figure (X2-X2 cross-sectional part) of FIG. 6B.

As described above with reference to FIGS. 4A to 6B, the seal ring 720 is detachably engaged with the piston member 710. Thus, the seal ring 720 can be easily replaced using the extraction port 12 (refer to FIG. 1) to which the openable cover 11 is attached without removing the slide valve 1 from the vacuum processing apparatus or the vacuum pump.

The gas G is generally corrosive process gas. Thus, the sealing members 721, 722, and 723 are likely to be eroded by the gas G. Therefore, the sealing members 721, 722, and 723 are frequently replaced. In the present embodiment, not only the sealing member 723, but also the sealing members 721 and 722 are disposed on the easily detachable seal ring 720. Therefore, the sealing members 721, 722, and 723 can be easily replaced.

The slide valve of the present embodiment has the following configuration and thereby achieves the following effects.

(1) The slide valve 1 is provided with the casing 2 which has a pair of facing flow channels 31 and 41, the slide plate 8 which is inserted into and removed from a space between the flow channels 31 and 41, and the annular sealing body 7 which slidingly moves in the facing direction (the up-down direction in FIG. 2) of the flow channels 31 and 41 inside the casing 2 by pressure of compressed air and comes into contact with the slide plate 8 inserted between the flow channels 31 and 41 to bring the valve 1 into a closed state.

The annular housing section 5 which has the inner peripheral wall surface 34A and the outer peripheral wall surface 44 and houses therein the slidingly moving sealing body 7 is formed on the casing 2.

The sealing member 722 which seals the gap between the sealing body 7 and the inner peripheral wall surface 34A is disposed on the inner peripheral wall surface 727 of the sealing body 7. The sealing member 721 which seals the gap between the sealing body 7 and the outer peripheral wall surface 44 is disposed on the outer peripheral surface 726 of the sealing body 7.

As described above, the slide valve 1 is provided with the annular housing section 5, the annular sealing body 7 which is housed in the housing section 5, and the sealing members 721 and 722 which are disposed between the housing section 5 and the sealing body 7. This configuration ensures the sealability of the sealing members 721 and 722 and thereby improves the reliability of the slide valve 1.

(2) The sealing body 7 is provided with the seal ring 720 on which the sealing members 721 and 722 are disposed and the piston member 710 which is connected to the seal ring 720 in the slide direction (the up-down direction in FIG. 2) and driven to slide by pressure of compressed air.

Even when the seal ring 720 and the piston member 710 are connected to each other in this manner, the sealing members 721 and 722 disposed on the seal ring 720 makes it possible to prevent the gas (the gas G illustrated in FIG. 2) which flows out of the vacuum processing apparatus, then flows through the inner peripheral side of the flow channel 31 and the flow channel 41, and then flows out to the vacuum pump from making contact with the connection region between the seal ring 720 and the piston member 710.

As a result, it is possible to prevent wear dust which may be generated in the connection region between the seal ring 720 and the piston member 710 from flowing out into the gas G.

(3) In the casing 2, the projection 71c having the engagement portions 71d is formed on the connection surface 718 of the piston member 710, and the groove 72a having the engagement portions 72b which is detachably engaged with the projection 71c having the engagement portions 71d is formed on the connection surface 729 of the seal ring 720.

This configuration enables the seal ring 720 to be attached to and detached from the piston member 710.

Further, the openable extraction port 12 enables the seal ring 720 to be easily replaced without removing the slide valve from the vacuum processing apparatus or the vacuum pump. Since the sealing members 721 and 722 are disposed on the seal ring 720 as described above, the sealing members 721 and 722 can also be easily replaced.

Figure 8:
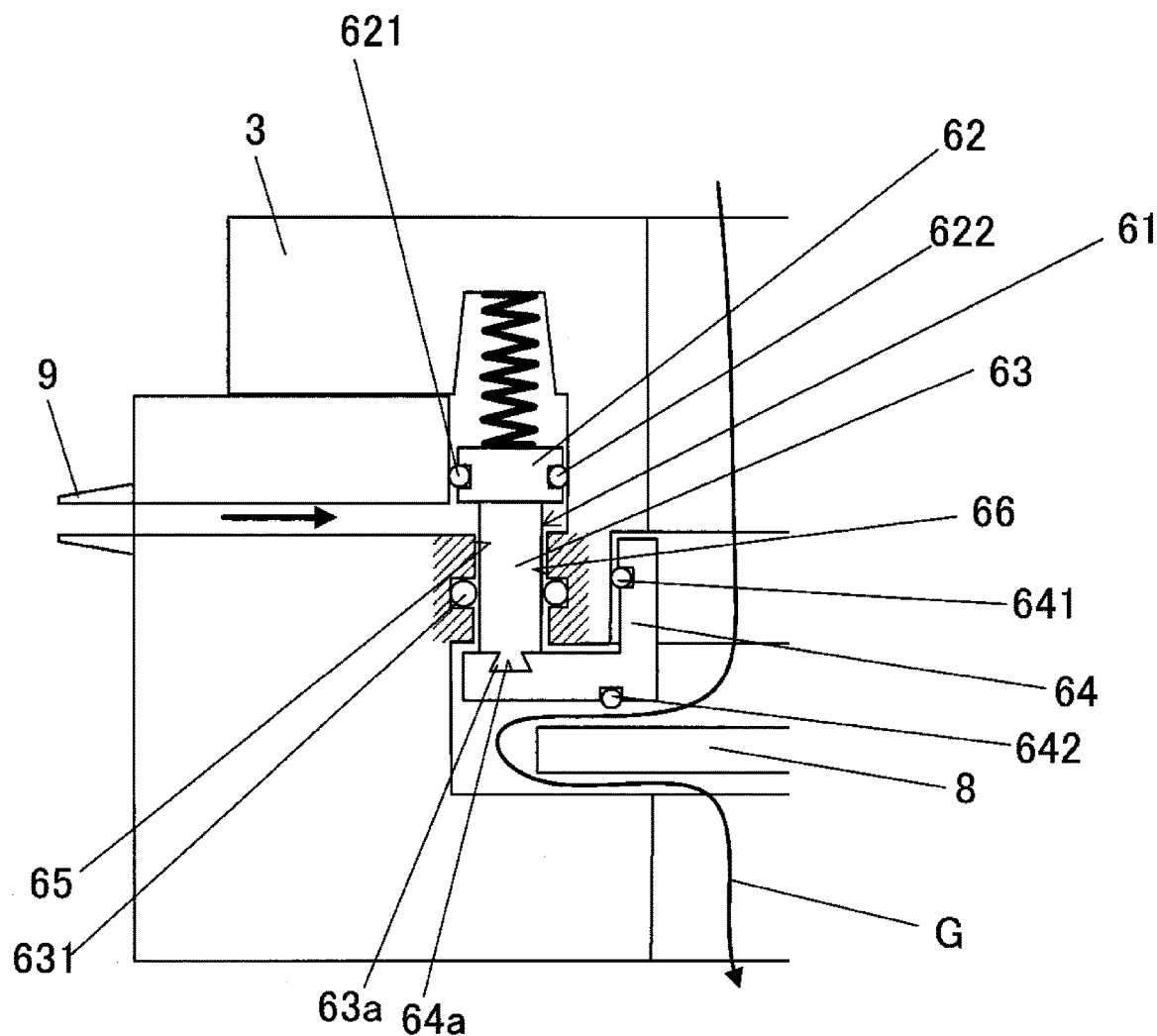
FIG. 8 is a partial cross-sectional view of a slide valve of a comparative example.

Hereinbelow, the slide valve described in Patent Literature 1 (hereinbelow, referred to as "slide valve 60") which has the sealing body using bolts will be described as a comparative example and compared with the slide valve 1 of the present embodiment shown in FIG. 2. FIG. 8 shows the slide valve 60 of the comparative example. A main difference between the slide valve 60 of the comparative example and the slide valve 1 of the present embodiment exists in the configuration of the sealing body. A sealing body 61 of the slide valve 60 has an annular piston 62, an annular seal ring 64, and a plurality of bolts 63 which connect the piston 62 and the seal ring 64 to each other, the bolts 63 being arranged in the circumferential direction.

(Comparison 1)

Comparison in the sealability of the sealing members will be discussed.

Figure 9:
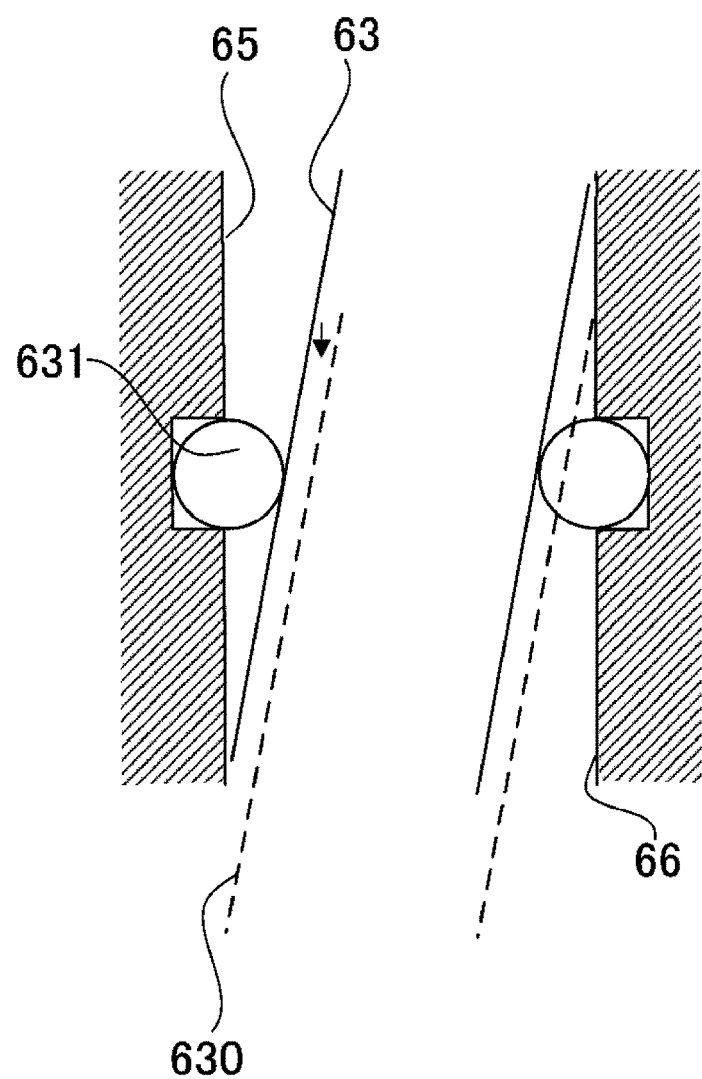
FIG. 9 is an enlarged view around a bolt of a sealing body of the slide valve of the comparative example.

When the annular piston 62 and the annular seal ring 64 are connected to each other using the bolts 63 as described above, it is necessary to allow the attachment position of each of the bolts in the piston 62 and the corresponding bolt attachment position in the seal ring 64 to accurately face each other. When a position shift occurs in a corresponding pair of bolt attachment positions, the axis of the bolt 63 is tilted with respect to the slide direction. In this case, the sealability of a sealing member 631 (refer to FIG. 9) is deteriorated due to an up-down movement of the bolt 63. Specific description will be made with reference to FIG. 9. FIG. 9 is an enlarged view around a bolt of the sealing body of the slide valve of the comparative example. In FIG. 9, when the tilted bolt 63 moves downward as indicated by broken lines 630, the sealability is deteriorated in the left side of the drawing. As a result, compressed air introduced through the coupler 9 may disadvantageously flow into a vacuum system. Further, the bolt 63 makes contact with wall surfaces 65 and 66, thereby disadvantageously causing flaw or operation failure.

On the other hand, since the annular piston member 710 and the annular seal ring 720 are connected to each other in a stacked state in the slide direction in the sealing body 7 of the slide valve 1 of the present embodiment, the above problems do not occur. Therefore, an excellent sealability of the sealing members 721 and 722 can be maintained.

(Comparison 2)

Comparison in the strength of the sealing body will be discussed.

In the sealing body 61 of the slide valve 60 of the comparative example, the annular piston 62 and the annular seal ring 64 are connected to each other using the bolts 63 arranged in the circumferential direction. Thus, in the sealing body 61, a member for connecting the annular piston 62 to the annular seal ring 64 is not disposed between the bolts 63, but a gap is formed between the bolts 63. As a result, the sealing body 61 may deform due to an insufficient strength and the bolt 63 may thereby be tilted. This may cause deterioration of the sealability of the sealing member 631 which is disposed on each of the bolts 63 of the sealing body 61 as shown in FIG. 9.

On the other hand, in the sealing body 7 of the slide valve 1 of the present embodiment, since the annular piston member 710 and the annular seal ring 720 are connected to each other in a stacked state in the slide direction, a gap as described above is not formed in the circumferential direction of the sealing body 7. As a result, it is possible to improve the strength of the sealing body 7 and thereby prevent deformation of the sealing body 7. Further, since the sealing body 7 is less deformable, an excellent sealability of the sealing members 721 and 722 of the sealing body 7 can be maintained.

(Comparison 3)

Comparison in the number of required sealing members will be discussed.

In the sealing body 61 of the slide valve 60 of the comparative example, the sealing members 631 are disposed on the respective bolts 63 so as to prevent compressed air from leaking toward the vacuum system.

On the other hand, the sealing body 7 of the slide valve 1 of the present embodiment only has the sealing member 722 on the inner peripheral side and the sealing member 721 (or 716) on the outer peripheral side. Thus, two sealing members are required. Therefore, it is possible to reduce the number of required sealing members compared to the comparative example. As a result, a burden caused by a replacement operation is reduced.

(Comparison 4)

Comparison in environment around the connection region will be discussed.

In the slide valve 60 of the comparative example, the seal ring 64 and each of the bolts 63 is connected to each other by engagement between the projection 63a and the recess 64a. Wear dust may be generated in the engagement part. In the slide valve 60 of the comparative example, the connection region is in contact with the gas G. Thus, the wear dust may flow out toward the vacuum system.

On the other hand, in the sealing body 7 of the slide valve 1 of the present embodiment, the connection region between the seal ring 720 and the piston member 710 does not make contact with the gas G. Thus, even if wear dust is generated, the generated wear dust does not flow out into the gas G.
(Comparison 5)

Comparison in easiness of replacement of the sealing members will be made. When the gas G has corrosiveness, a sealing member which is in contact with the gas G is likely to be eroded. Thus, replacement of the sealing member is frequently performed.

In the slide valve 60 of the comparative example, the sealing members 631, 641, and 642 make contact with the gas G. The sealing members 641 and 642 are disposed on the detachable seal ring 64, and therefore easily replaced. However, the sealing member 631 disposed on the peripheral surface of each of the bolts 63 cannot be replaced unless removing the slide valve 60 from the vacuum processing apparatus or the vacuum pump and further removing the flange 3.

On the other hand, in the sealing body 7 of the slide valve 1 of the present embodiment, the sealing members 721, 722, and 723 make contact with the gas G. All of the sealing members 721, 722, and 723 are disposed on the detachable seal ring 720, and can therefore be easily replaced.

The slide valve 1 of the present embodiment may be modified in the following manner.

—First Modification in Driving of Sealing Body 7—

Figure 7A:
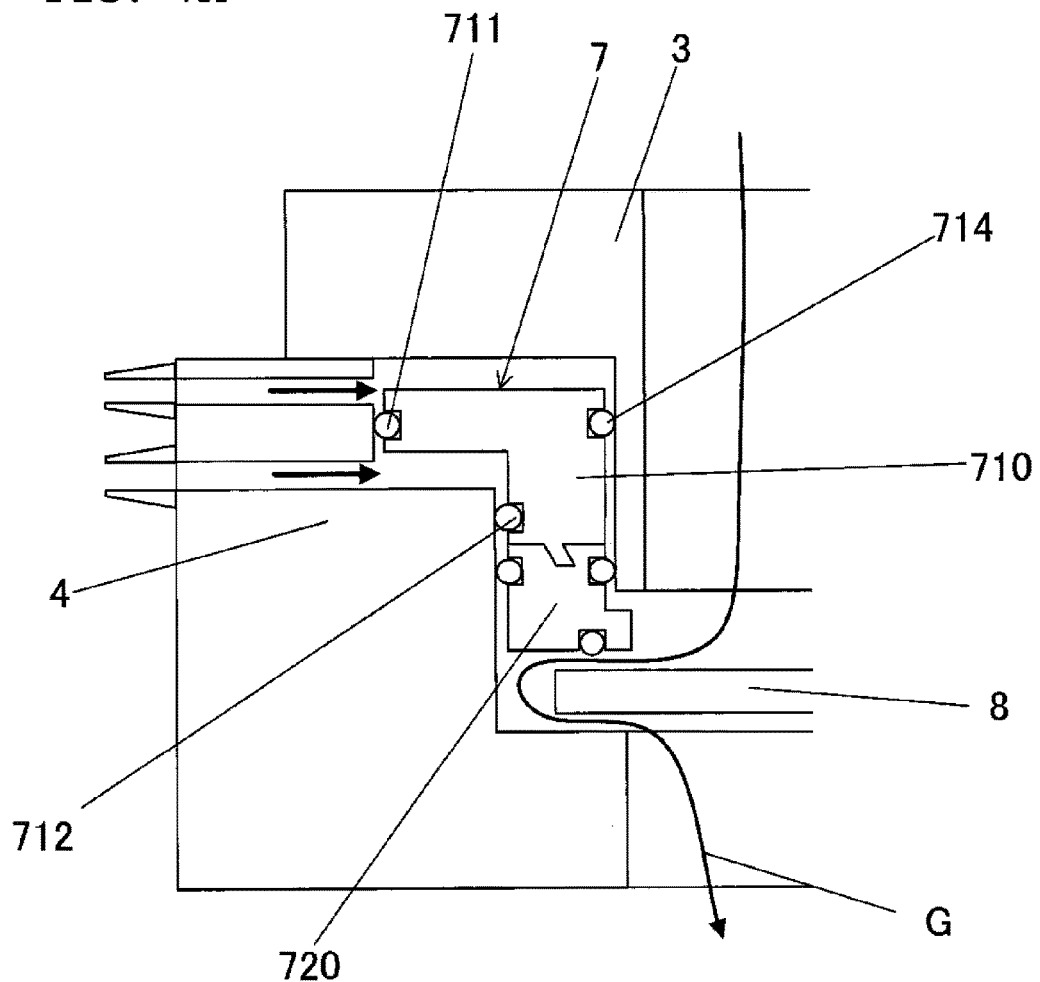
FIGS. 7A to 7C are partial cross-sectional views of a slide valve according to a modification of the embodiment of the present invention.

FIG. 7A shows a first modification in driving of the sealing body 7. The sealing body 7 described in the above embodiment is driven by compressed air and the compression spring 50 as shown in FIG. 2. Alternatively, compressed air may be used instead of the compression spring 50 as in the present modification shown in FIG. 7A. In this case, it is necessary to dispose a sealing member 714 on the inner peripheral side of the piston member 710 in addition to the sealing members used in the above embodiment. Such a modification also achieves the same effects as achieved by the above embodiment.

—Second Modification in Driving of Sealing Body 7—

Figure 7B:
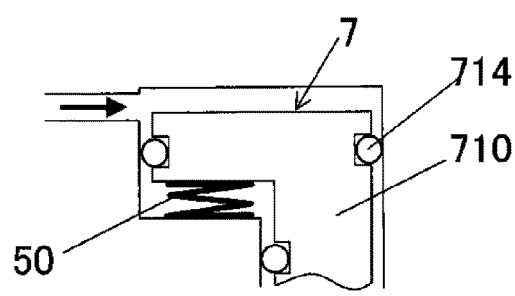

FIG. 7B shows a second modification in driving of the sealing body 7. As shown in FIG. 2, the sealing body 7 described in the above embodiment moves upward in FIG. 2 by compressed air and moves downward in FIG. 2 by the compression spring 50. As shown in FIG. 7B, a sealing body 7 of the present modification moves upward in FIG. 2 by the compression spring 50 and moves downward in FIG. 2 by compressed air. Such a modification also achieves the same effects as achieved by the above embodiment.

—Third Modification in Driving of Sealing Body 7—

Figure 7C:
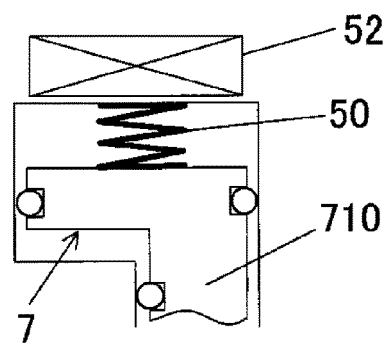

FIG. 7C shows a third modification in driving of the sealing body 7. As shown in FIG. 2, the sealing body 7 described in the above embodiment moves upward in FIG. 2 by compressed air and moves downward in FIG. 2 by the compression spring 50. As shown in FIG. 7C, a sealing body 7 of the present modification moves upward in FIG. 2 by magnetically attracting a piston member 710 using an electromagnet 52 instead of using compressed air. Thus, the piston member 710 of the present modification is made of a magnetic material. Further, the sealing body 7 of the present modification moves downward in FIG. 2 by the compression spring 50 in the same manner as in the above embodiment. Such a modification also achieves the same effects as achieved by the above embodiment.

—Modification in Engagement Relationship Between Seal Ring and Piston Member—

Although the groove 72a having the engagement portions 72b is formed on the connection surface 729 of the seal ring 720 and the projection 71c having the engagement portions 71d is formed on the connection surface 718 of the piston member 710 in the above, the present invention is not limited to this configuration. A projection (referred to as "projection A") having engagement portions may be formed on the connection surface 729 of the seal ring 720, and a groove having engagement portions which are engaged with the projection A may be formed on the connection surface 718 of the piston member 710.

Although the sealing body 7 is driven by pressure of compressed air in the above, the sealing body 7 may be driven by another fluid pressure such as oil pressure. Alternatively, the sealing body 7 may be driven by an electromagnet.

The present invention is not limited to the above contents. Other modes conceivable within the technical idea of the present invention also fall within the scope of the present invention.

What is claimed is:

1. A slide valve comprising:
   a casing having a pair of facing flow channels;
   a slide plate inserted into and removed from a space between the flow channels; and
   an annular sealing body slidingly moving in a facing direction of the flow channels inside the casing and coming into contact with the slide plate inserted between the flow channels to bring the slide valve into a closed state, wherein
   an annular housing section having an inner peripheral wall surface and an outer peripheral wall surface and housing the slidingly moving sealing body is formed on the casing,
   a first sealing member sealing a gap between the sealing body and the inner peripheral wall surface is disposed on an inner peripheral surface of the annular sealing body and a second sealing member sealing a gap between the sealing body and the outer peripheral wall surface is formed on an outer peripheral surface of the annular sealing body,
   the sealing body includes an annular seal ring on which the first sealing member and the second sealing member are disposed, and an annular piston member which is directly connected to the seal ring in a slide direction in a stacked state and driven to slide,
   the annular piston member includes a pressure receiving section on which a compressed air introduced acts and a tubular section, wherein the tubular section comprises a cylindrical wall sharing a common center axis with that of the annular seal ring, and
   an outer peripheral surface of the annular piston member includes a large diameter section which is an outer peripheral surface of the pressure receiving section and a small diameter section which is an outer peripheral surface of the tubular section such that the compressed air acts on a surface of the pressure receiving section extending from the small diameter section to the large diameter section to move the annular sealing body in the opposite direction of the facing direction of the flow channels.

2. The slide valve according to claim 1, wherein
   a projecting engagement portion is formed on one connection surface of the seal ring and the piston member, and
   a recessed engagement portion which is detachably engaged with the projecting engagement portion is formed on the other connection surface of the seal ring and the piston member.

3. The slide valve according to claim 1, wherein
the seal ring is detachably connected to the piston member, and
all of the sealing member, including the first sealing member and the second sealing member, making contact with gas flowing through the flow channels is disposed on the seal ring.

4. The slide valve according to claim 1, wherein
a third sealing member is disposed in a recess which is formed on the large diameter section, and a fourth sealing member is disposed in a recess which is formed on the small diameter section.

\* \* \* \* \*